June 20, 1939. S. L. CLOTHIER ET AL 2,163,549
LIGHT MODULATING CELL AND ELECTRODE THEREFOR
Filed Oct. 15, 1936    2 Sheets-Sheet 1

Inventors
Stewart L. Clothier
Harold C. Hogencamp

June 20, 1939. S. L. CLOTHIER ET AL 2,163,549
LIGHT MODULATING CELL AND ELECTRODE THEREFOR
Filed Oct. 15, 1936  2 Sheets-Sheet 2

Inventors.
Stewart L. Clothier
Harold C. Hogencamp

UNITED STATES PATENT OFFICE 2,163,549

LIGHT MODULATING CELL AND ELECTRODE THEREFOR

Stewart L. Clothier, East Orange, and Harold C. Hogencamp, Irvington, N. J., assignors to Kolorama Laboratories, Inc., Newark, N. J., a corporation of New Jersey Application October 15, 1936, Serial No. 105,648

2 Claims. (Cl. 88—61)

This invention relates to light modulating cells capable of exhibiting the Kerr effect upon a beam of polarized light. More particularly, the invention is concerned with cells of this type wherein the electrodes are arranged and disposed coaxially with respect to each other, such as shown in the light modulating cell described in our copending application Serial No. 83,588 filed June 4, 1936 now Patent 2,100,836, of which this application is a continuation-in-part.

There are available at the present time many modified forms of the original Kerr cell, but these, so far as they are known to us, are all deficient in one respect or another for use in high definition television systems, particularly because of the relatively high internal capacity of the cells. The high internal capacity of known forms of Kerr cells is due primarily to the arrangement, form and disposition of the electrodes thereof, and this high capacity renders them impractical for use in television systems wherein pictures of an order of 200 lines are to be transmitted.

With the above facts in mind the present invention seeks to provide light modulating cells of the type disclosed in our copending application above referred to, wherein the electrodes are designed as to form and relative position with respect to each other so as to reduce internal capacity of the cell to a substantially negligible quantity.

One object of the invention is to provide electrodes for a light modulating cell wherein one electrode may be provided with a bore defining the light axis of the cell and within which, and coaxially disposed with respect thereto, is a second electrode of relatively small cross-sectional area.

Another object of the invention is to design the electrodes such as referred to in the preceding paragraph such that their opposed surfaces have the same or substantially the same general contour in cross-section.

Another object of the invention is to provide electrodes of the type indicated wherein the outer or hollow electrode is formed to facilitate grouping of the electrodes in close proximity to each other and with a minimum loss of light from the beam passing through a group of cells.

Another object of the invention is to provide the outer hollow electrode with a bore passing longitudinally through the electrode, said bore being of a shape designed to conserve to the highest degree the beam of light entering said bore.

These and other objects of the invention will become apparent from a consideration of the following specification read in connection with the accompanying drawings wherein preferred forms of the invention have been shown.

In the accompanying drawings:

Figure 1 is a longitudinal sectional view of a light modulating cell of the type shown in our copending application Ser. No. 83,588.

Figs. 2, 3, 4, 5, 6, 7, 8 and 9 are perspective views partly in cross-section showing modified forms of the electrodes of the cell shown in Fig. 1.

Figure 10:
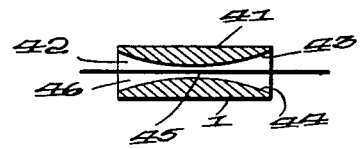
Figs. 10, 11, 12, 13, 14, 15, 16 and 17 are longitudinal sectional views showing modified forms of the bore through the outer or hollow electrode of the cell shown in Fig. 1.

As hereinbefore set forth, the present invention is concerned primarily with the problem of reducing the internal electrostatic capacity of light modulating cells to an extent such that they may be effectively utilized in television systems transmitting pictures of high definition. The degree to which a polarized beam of light passing through a light modulating cell exhibiting the Kerr effect may be rotated, may be calculated by the following formula:

$$\text{Rotation} = \frac{KLE^2}{D^2}$$

In this formula K represents the suitable constant, L the length of the electrodes, E the applied voltage, and D the distance between the electrodes. From a consideration of this formula it is apparent that the degree of rotation is directly proportional to the length of the electrodes and inversely proportional to the square of the distance between the electrodes. With these facts in mind we have developed electrodes for light modulating cells which are relatively elongated and which are formed and disposed relative to each other in a manner such that the effective distance between the electrodes is reduced to the lowest possible figure commensurate with the required light efficiency of the cell.

Referring more particularly to the accompanying drawings:

Figure 1 shows a cell of the type in which the electrodes illustrated in Figs. 2 to 17 inclusive may be utilized. This cell comprises an outer envelope or container 1' having aligned transparent window portions 2, 2. The windows 2 may be secured to the body of the container 1' in any suitable manner such as by bezels 3 augmented as desired by the application of suitable cement at the meeting surfaces between the windows 2 and the container 1', which surfaces are indicated by the reference numeral 4. Within the container 1' is mounted an outer or hollow electrode 5 which is suitably positioned with respect to the walls of the container by spacing diaphragms 6, 6. The diaphragms 6 may be suitably apertured as at 7 to permit free circulation within the container of a birefringent fluid 8. The electrode 5 is provided with a bore 9 extending longitudinally of the cell and having its axis aligned with the transparent windows 2, 2. The bore 9 may partake of any desired configuration, the electrode in Fig. 1 being shown with an intermediate constriction 10 which, when the cell is in use, is located substantially at the focal point of a lens through which a light beam is directed upon the cell. An inner or central electrode 11 is mounted coaxially within the bore of the electrode 5, said electrode being substantially filamentary in form, such as a strand of any suitable conducting material. The electrode 11 may be mounted in any suitable manner within the electrode 5 such as through the means of electrode supports 12, 12 suitably sealed as at 14 within the walls of the container 1'. Suitable terminals 13 and 15 are provided extending exteriorly of the walls of the container 1' through which may be applied a suitable source of potential for the purpose of creating a desired potential difference between the electrodes 5 and 11 within the container. The terminal 15, as shown, is connected to the electrode 5 within the container and is suitably sealed to the walls of the container at point 16.

The electrodes 5 and 11 of the cell shown in Fig. 1 are substantially cylindrical, with the bore 9 of the inner electrode comprising substantially conical recesses having their apices meeting at a point intermediate the ends of the electrode. While this is a desirable form for the electrodes, we have found that equally advantageous results may be obtained from cells of this same general type by having electrodes of slightly modified form.

Thus, referring to Fig. 2, we have shown an outer electrode 17 in the form of a rectangular body of conducting material having a rectangular bore 18 passing longitudinally therethrough. The inner or central electrode 19 is in the form of a filament or strand of rectangular cross-section having the exterior surfaces thereof disposed in substantial parallelism with the opposed inner and outer surfaces of the rectangular bore 18. The electrode 19 is disposed centrally within the rectangular bore 18 and coaxially thereof. The horizontal and vertical side walls of the electrode 2 in this form are of the same dimension so as to provide an electrode which is square in cross-section.

In Fig. 3 the arrangement is similar in all respects to that shown in Fig. 2 with the exception that the inner electrode 20 is substantially cylindrical in form. The electrode 20 is, however, disposed coaxially within the rectangular bore 18 of the outer electrode 17.

In some instances it is found desirable to provide for a greater expansion or distribution of the light beam along one axis than another, and in such instances we provide an outer electrode rectangular in cross-section and having a greater dimension in one direction than the other. Thus, the outer electrode 117 in Fig. 4 has a greater transverse dimension 21 than the vertical dimension 22 thereof. This provides an electrode having the major dimension of its cross-sectional area disposed in a substantially horizontal plane. It is obvious that in instances where a greater expansion or distribution of the light beam is desired in a vertical direction, the electrode as shown in Fig. 4 may be rotated 90 degrees in one direction or the other to bring its major axis in the plane in which the greatest distribution of light is desired. The outer electrode 17 of Fig. 4 is provided with a rectangular bore 23 which is correspondingly disposed with reference to the major and minor axes thereof as is the outer electrode 17. The inner or central electrode 24 is disposed coaxially with respect to the rectangular bore 23 and, due to the difference in vertical and transverse connections of said bore, the said central electrode 24 may be positioned closer to the upper and lower faces of said bore than to the side faces thereof. The inner electrode 24 is shown as a substantially cylindrical strand but if desired this strand may take the form shown in Fig. 2 without departing from the spirit of the invention.

In Fig. 5 we have shown further modified forms of electrodes wherein the outer electrode 25 is in the form of a six-sided body of conductive material having a similarly shaped longitudinal bore 26. Preferably the side walls of the electrode 25 and the bore 26 therein are of equal dimension so as to provide an electrode having a transverse configuration substantially hexagonal as to form. Also, it will be noted that the walls of the bore 26 are arranged in substantial parallelism with the exterior walls of the electrode. Mounted coaxially within the bore 26 and extending longitudinally thereof is a strand-like inner electrode 27 which may have any desired external configuration but which is preferably formed to provide an exterior having six flat faces 28 which are respectively disposed in general parallelism to the opposed faces of the bore 26.

In Fig. 6 we have shown the outer electrode 29 in the form of a cylindrical body of conducting material having a longitudinal bore 30 of polygonal form in cross-section. In the instance shown the bore is hexagonal, having six equal sides, but it is to be understood that the particular configuration of the inner bore may be varied as desired to provide more or less than six surfaces. In this form of the invention the inner electrode 31 is in the form of a cylindrical strand of conducting material arranged coaxially with respect to the bore 30.

In Fig. 7 the outer electrode 32 is formed from a body of conducting material having eight sides of equal dimension so that a cross-section thereof is in the form of an octagon, as shown. The inner electrode 33 is in the form of a cylindrical strand of conducting material disposed coaxially within a longitudinal bore 34 polygonal in cross-section and with the side walls of said bore arranged in general parallelism to the side walls of the electrode 32.

In Fig. 8 the outer electrode 35 is shown in the form of a three-sided prism having a similarly shaped longitudinal bore 36, the side walls of the triangular bore being arranged in general parallelism with the exterior face of the electrode 35. Coaxially within the bore 36 is disposed a strand-like electrode 37 having the same general configuration as the electrode 35, the exterior walls or faces of said inner electrode 37 being arranged in general parallelism with the opposed faces of the bore 36.

In Fig. 9 the outer electrode 38 is in the form of a rectangular polygon having the horizontal dimension thereof exceeding the vertical dimension thereof. The electrode 38 in this instance is provided with a longitudinal bore 39 generally elliptical in cross-sectional form, as shown, and mounted coaxially of said bore is the inner central electrode 40, said electrode being in the form of a substantially cylindrical strand of conducting material.

Figure 18:
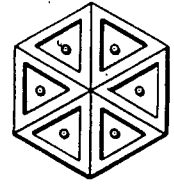
Figs. 18 and 19 show end views of groups of electrodes of the kinds shown by Figs. 5 and 8.
Figure 19:
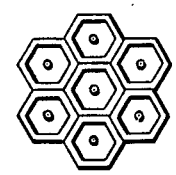

In all forms of the invention illustrated in Figs. 2 to 9 inclusive, the outer electrode has been fashioned to provide an exterior surface which will permit the electrodes to be grouped in close proximity to each other for the purpose of minimizing the loss in the beam of light concentrated upon said electrodes. The manner in which the electrodes may be conveniently grouped is suggested diagrammatically in Figs. 18 and 19. In Fig. 18 we have shown six electrodes of the type indicated in Fig. 8 arranged in a closely compacted group, whereas in Fig. 19 we have shown a similar group of cells of the type illustrated in Fig. 5. In instances such as indicated in Figs. 18 and 19 the outer electrodes of the several cells of the group are in electrical contact with one another so that they have a common potential with reference to the inner electrodes which, being insulated, from the outer electrodes by the birefringent medium of the cell, may have the same or different respective potentials as desired.

Referring to Figs. 10 to 17 inclusive, we have shown in longitudinal section different forms of longitudinal bore with which the outer electrode may be provided. Thus, in Fig. 10 the outer electrode 41 is provided with a longitudinal bore 42 which is circular in cross-section and the walls of which are curved longitudinally of the bore to provide in cross-section the opposed concave surfaces 43 and 44. Thus, the walls of the bore 42 taper uniformly towards a point 45 intermediate the ends of the electrode 41 to define a point of maximum constriction through which the inner electrode 46 extends in coaxial relation.

Figure 11:
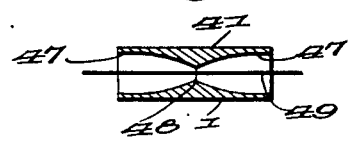

In Fig. 11 the outer electrode 41 has a central bore comprising two substantially parabolic recesses 47 extending inwardly from opposite ends of the electrode and intersecting at a point 48 intermediate the ends of the electrode to define there a point of maximum constriction. The inner electrode 49 is disposed coaxially of the bore 47, 47.

Figure 12:
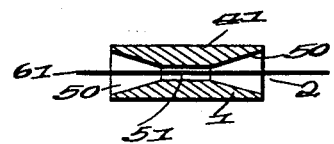

In Fig. 12 a form of electrode is shown wherein the outer electrode is provided with a central longitudinal bore comprising substantially conical recesses 50 reversely positioned and extending inwardly from the opposite end of the electrode and having their apices joined or connected by a substantially cylindrical bore 51 of substantially reduced diameter. Thus, the cylindrical portion 51 of the bore defines a neck or constriction of substantial linear dimension in contradistinction to the point constriction such as shown in Figs. 1 and 11.

Figure 13:
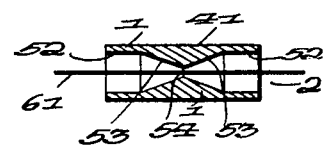

In Fig. 13 the outer electrode is shown provided with a bore comprising cylindrical sections 52 extending from opposite ends of the electrode inwardly, the inner ends of said cylindrical section being connected by substantially conical bores 53 arranged with their apices extending towards each other and interconnecting at a point 54 substantially midway between the ends of the electrode and defining at that point an area of maximum constriction.

Figure 14:
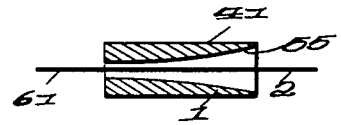

In Fig. 14 is shown the outer electrode 41 provided with a longitudinally extending central tapered bore 55 extending from one end of the electrode to the other. The bore 55 has a maximum cross-sectional area at one end of the electrode and the walls of the bore uniformly taper to a point of maximum constriction at the opposite end of the bore. The walls of the bore are preferably curved transversely to provide a parabolic surface similar to that shown in Fig. 10, but wherein the axis of the parabola is adjacent one end of the electrode rather than central thereof, as shown in Fig. 10.

Figure 15:
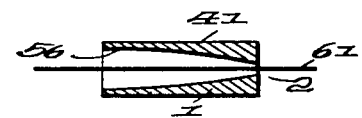

Fig. 15 shows the outer electrode provided with a tapered bore 56, the walls of said bore being generally parabolic in curvature and reversely disposed with reference to that shown in Fig. 14. In considering the walls or surfaces defining the bores in the electrodes shown in Figs. 10, 11, 14 and 15, it will be noted that these surfaces are surfaces of revolution generated by revolving arcuate surfaces about the axis of the electrode. In Figs. 10 and 14 the arc of revolution is positioned with the concavity of the arc directed away from the axis of revolution, whereas in Figs. 11 and 15 the concavity of the revolved arc is directed towards the axis of revolution.

Figure 16:
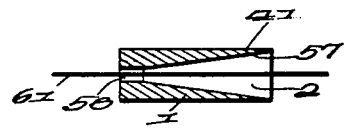

In Fig. 16 the outer electrode is provided with a bore comprising a substantially conical recess 57 extending from one end of the electrode towards the other and terminating adjacent the other end in a substantially cylindrical section 58 of substantially smaller diameter.

Figure 17:
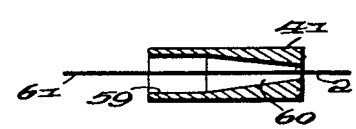

In Fig. 17 the outer electrode is provided with a bore comprising a substantially cylindrical section 59 extending from one end of the electrode inwardly and communicating with a substantially conical bore 60, the base of which coincides with the end of the circular bore section 59 and the truncated end of the conical section coinciding with the opposite end of the electrode.

In all of the forms of the invention shown in Figs. 12 to 17 inclusive the inner electrode is in the form of a strand of conducting material 61 of any desired cross-sectional configuration and disposed coaxially of the bore within the outer electrode.

In all forms of the electrode shown in Figs. 10 to 17 inclusive the central longitudinal bore of the outer electrode is characterized by a form such that a maximum amount of light of the beam penetrating the electrode is conserved and passed through a constricted portion of the electrode in a concentrated beam. It will be understood that any and all forms of the electrode bore shown in Figs. 10 to 17 inclusive may be used in connection with electrodes having external configurations corresponding to any of the forms shown in Figs. 2 to 9 inclusive without departing from the spirit of the invention.

The constriction common to all forms of the electrode shown in Figs. 1 and 10 to 17 is of the order of 1 mm. in diameter. Considering this dimension in the light of the formula hereinbefore referred to for calculating the degree of rotation, it is apparent that the factor D of said formula becomes quite small, it being the effective distance between the electrodes of the cell, so that in constructions such as here illustrated the inherent capacity of the cell because of this constriction of relatively small diameter, is of substantially negligible value.

From the foregoing specification it is apparent that we have devised electrodes for use in light modulating cells of the type disclosed in Fig. 1 which are all characterized by the ability to conserve to a maximum the light beam directed upon the cell, and in which the exterior configuration of the outer or hollow electrode is such as to facilitate grouping of the cells as shown in Figs. 18 and 19 with a minimum loss of light. Also, the general arrangement and disposition of the electrodes with respect to each other is such that the inherent electrostatic capacity of the cell is reduced to a negligible value.

It will be understood that although we have shown several preferred forms of the electrode structure forming the subject-matter of this invention, such changes in form and disposition of the electrodes may be made as fairly fall within the scope of the appended claims without departing from the spirit of the invention.

Having thus described our invention, what we claim as new is:

1. In a light modulating cell of the Kerr type in combination, a tubular flat sided electrode of regular polygonal cross section, and an electrode strand of similar geometrical pattern in cross section disposed axially of the tubular electrode, the outer flat sides of the tubular electrode being parallel with the flat sides of the electrode strand.

2. In a light modulating cell of the Kerr type, in combination, a tubular flat sided electrode of regular polygonal cross section and with parallel outer and inner surfaces, and an electrode strand of similar geometrical pattern in cross section disposed axially of the tubular electrode and having surfaces parallel with the surfaces of the outer electrode.

STEWART L. CLOTHIER.
HAROLD C. HOGENCAMP.